United States Patent
Lee et al.

(10) Patent No.: US 9,170,713 B2
(45) Date of Patent: Oct. 27, 2015

(54) ELECTRONIC DEVICE AND CONTROL METHOD THEREOF

(75) Inventors: Kunho Lee, Seoul (KR); Kange Lee, Seoul (KR); Jinhwan Jung, Seoul (KR); Yongdeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 469 days.

(21) Appl. No.: 13/221,274

(22) Filed: Aug. 30, 2011

(65) Prior Publication Data

US 2012/0089947 A1  Apr. 12, 2012

(30) Foreign Application Priority Data

Oct. 7, 2010  (KR) .................. 10-2010-0097715

(51) Int. Cl.
*G06F 3/0483* (2013.01)
*G06F 3/0486* (2013.01)
*G06F 3/0488* (2013.01)
*G09G 5/14* (2006.01)
*G09G 5/36* (2006.01)

(52) U.S. Cl.
CPC ............ *G06F 3/0483* (2013.01); *G06F 3/0486* (2013.01); *G06F 3/04883* (2013.01); *G09G 5/14* (2013.01); *G09G 5/363* (2013.01); *G09G 2370/10* (2013.01); *G09G 2380/14* (2013.01)

(58) Field of Classification Search
CPC .............. G06F 2203/04808; G06F 3/0483
USPC .......................... 715/839, 845, 771
See application file for complete search history.

(56) References Cited

U.S. PATENT DOCUMENTS

| | | | | |
|---|---|---|---|---|
| 5,592,605 A | * | 1/1997 | Asuma et al. .................. | 715/775 |
| 5,774,120 A | * | 6/1998 | Goddard et al. ............... | 715/845 |
| 6,075,536 A | * | 6/2000 | Kunieda et al. ............... | 715/848 |
| 6,240,410 B1 | * | 5/2001 | Wical .................................. | 1/1 |
| 6,295,056 B1 | * | 9/2001 | Morgan et al. ................. | 715/763 |
| 7,218,330 B1 | * | 5/2007 | Winkenbach et al. ......... | 345/620 |
| 7,454,717 B2 | * | 11/2008 | Hinckley et al. ............... | 715/863 |
| 8,350,925 B2 | * | 1/2013 | Matsumoto et al. ........ | 348/231.2 |
| 8,402,382 B2 | * | 3/2013 | Agarawala et al. ............ | 715/765 |
| 2006/0085767 A1 | * | 4/2006 | Hinckley et al. ............... | 715/863 |
| 2008/0143685 A1 | * | 6/2008 | Lee et al. ........................ | 345/173 |
| 2008/0216009 A1 | * | 9/2008 | Drallos .......................... | 715/776 |
| 2009/0235162 A1 | * | 9/2009 | Nuccio et al. .................. | 715/255 |
| 2009/0239202 A1 | * | 9/2009 | Stone .............................. | 434/178 |
| 2009/0307623 A1 | * | 12/2009 | Agarawala et al. ............ | 715/765 |
| 2010/0083111 A1 | * | 4/2010 | de Los Reyes ................ | 715/702 |
| 2010/0122170 A1 | * | 5/2010 | Girsch et al. ................... | 715/727 |
| 2010/0253807 A1 | * | 10/2010 | Matsumoto et al. ........ | 348/231.5 |
| 2011/0209058 A1 | * | 8/2011 | Hinckley et al. ............... | 715/702 |
| 2012/0026100 A1 | * | 2/2012 | Migos et al. ................... | 345/173 |
| 2012/0044179 A1 | * | 2/2012 | Hudson .......................... | 345/173 |
| 2012/0050789 A1 | * | 3/2012 | Bachman et al. ............. | 358/1.15 |
| 2013/0021281 A1 | * | 1/2013 | Tse et al. ....................... | 345/173 |

* cited by examiner

*Primary Examiner* — William Bashore
*Assistant Examiner* — Nathan Shrewsbury
(74) *Attorney, Agent, or Firm* — Birch, Stewart, Kolasch & Birch, LLP

(57) ABSTRACT

An electronic device and a method of controlling the electronic device are provided.
The electronic device may group items based on a drag input on a virtual bookshelf having the items.

20 Claims, 12 Drawing Sheets (S701)　　　　　　　　(S702)

ELECTRONIC DEVICE AND CONTROL METHOD THEREOF

This application claims the benefit of Korean Patent Application No. 10-2010-0097715 filed on Oct. 7, 2010, the contents of which are hereby incorporated by reference in their entirety.

BACKGROUND

1. Field

The present invention relates to an electronic device and a control method thereof.

2. Related Art

Recently, as electronic book ("e-book") services are provided by electronic devices, an improvement in structure and/or software of the electronic devices is being considered.

SUMMARY

Exemplary embodiments of the present invention provide an electronic device and a method of controlling the electronic device that may provide an e-book service.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

In the following description, suffixes "module" and "unit" are given to components of the electronic device in consideration of only facilitation of description and do not have meanings or functions discriminated from each other.

The electronic device described in the specification may include a smart phone, laptop computer, a digital broadcasting terminal, a personal digital assistant (PDA), a portable multimedia player (PMP), a digital TV, a desktop computer, a set-top box, a digital camera, and a navigation system, for example.

Figure 1:
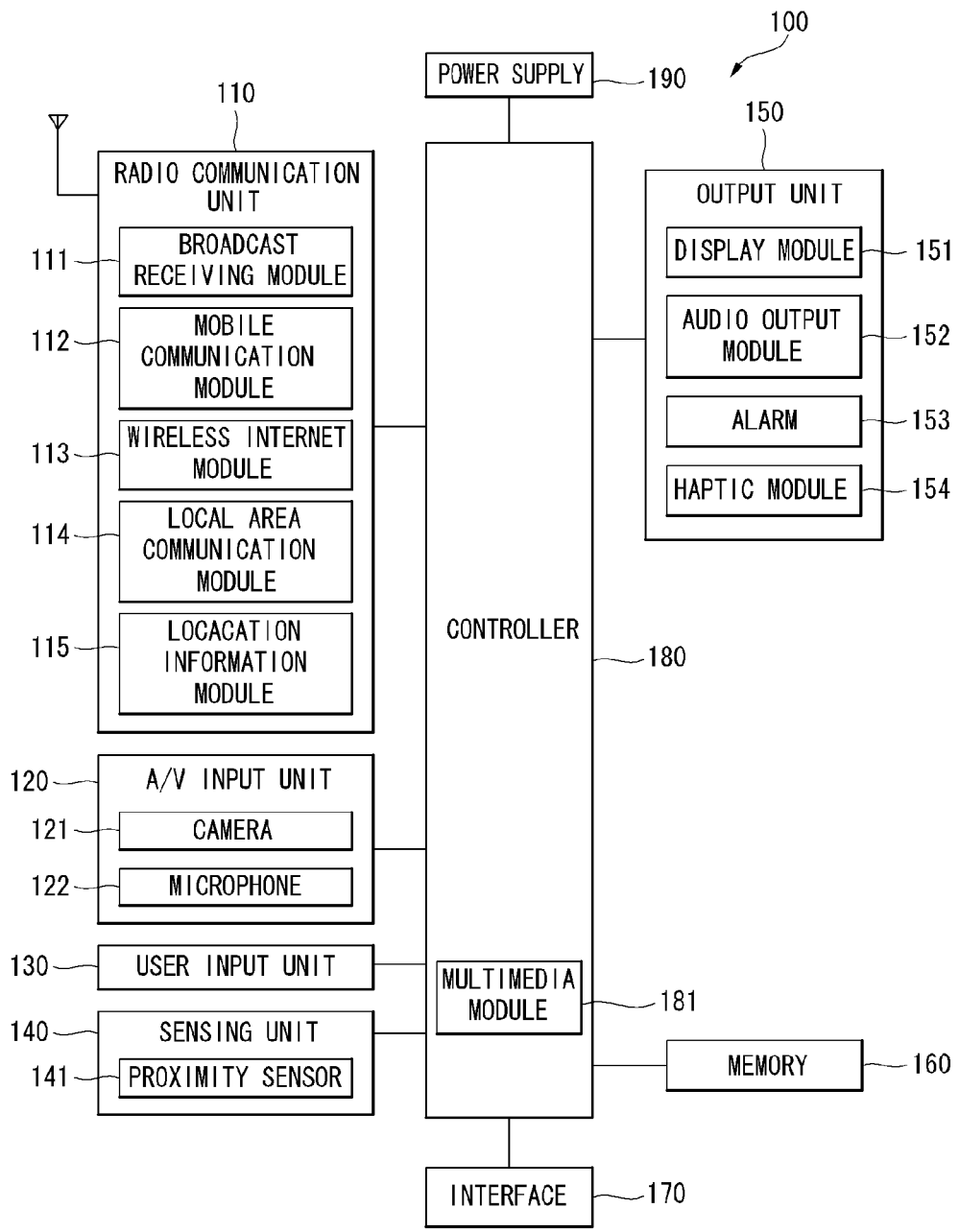
FIG. 1 is a block diagram of an electronic device according to an embodiment of the present invention.

FIG. 1 is a block diagram of an electronic device 100 according to an embodiment of the present invention. Other embodiments, configurations and arrangements may also be provided. As shown, the electronic device 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the electronic device 100 may be varied. The components of the electronic device 100 will now be described.

The communication unit 110 can include at least one module that enables communication between the electronic device 100 and a communication system or between the electronic device 100 and a network in which the electronic device 100 is located. For example, the communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to the electronic device. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external device and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the electronic device. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the communication unit 110. The electronic device 100 can include at least two cameras according to constitution of the electronic device 100.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the electronic device 100 from a user. The user input unit 130 can include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the electronic device 100. For example, the display unit 151 displays UI or graphic user interface (GUI) related to a telephone call when the electronic device is in the call mode. The display unit 151 displays a captured or/and received image, UI or GUI when the electronic device 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the electronic device 100 through an area of the body of the electronic device 100, which is occupied by the display unit 151.

The electronic device 100 can include at least two display units 151 according to constitution of the electronic device 100. For example, the electronic device 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the electronic device, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the electronic device 100. The audio output module 152 can include a receiver, a speaker, a buzzer, etc.

The alarm 153 outputs a signal for indicating generation of an event of the electronic device 100. Examples of events generated in the electronic device include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to constitution of the electronic device.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the electronic device 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the electronic device 100 through a port.

The interface 170 can serve as a path through which power from an external cradle is provided to the electronic device 100 when the electronic device 100 is connected to the external cradle or a path through which various command signals inputted by the user through the cradle to the electronic device 100. The various command signals or power input from the cradle can be used as a signal for confirming whether the electronic device 100 is correctly set in the cradle.

The controller 180 controls the overall operation of the electronic device. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the electronic device under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

The embodiments disclosed herein may be implemented by the electronic device 100 described with reference to FIG. 1.

The "tapping" herein means that a user lightly touches a touch screen that is the display unit 151. For example, the tapping may include a touch gesture corresponding to a click of a mouse generally performed in a computer. The "drag" herein means that a user moves a touched point to another position while maintaining the touch on the touch screen 151 and then releases the touch. While dragged, an object may be continuously displayed moving along the drag direction. The "flicking" herein means that a user touches the touch screen 151, moves the touched point in a specific direction (for example, in an upper, lower, left, right, or diagonal direction), and then releases the touch. In response to a touch inputted by flicking, the electronic device 100 may perform a specific operation based on a flicking direction or speed. For example, the electronic device 100 may perform an operation of flipping the page in an e-book based on the flicking direction. The "press" means that a user continuously maintains a touch performed on the touch screen 151 for a predetermined time. The "multi-touch" herein means that a user touches the touch screen 151 at a plurality of points.

A method of controlling the electronic device 100 and an operation of the electronic device 100 according to an embodiment of the present invention will be described with reference to the accompanying drawings.

Figure 2:
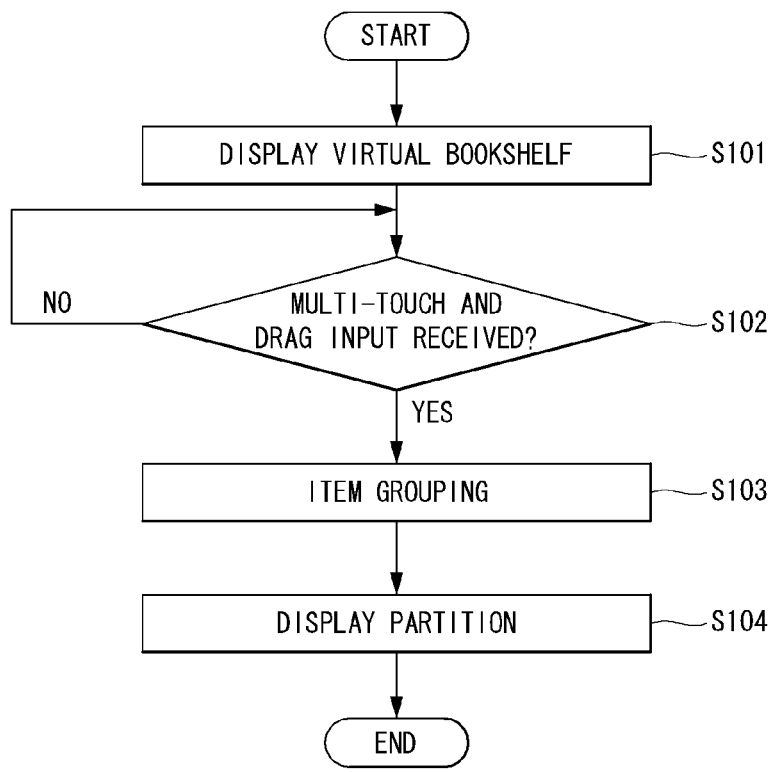
FIG. 2 is a flowchart illustrating a method of controlling an electronic device according to an embodiment of the present invention.

FIG. 2 is a flowchart illustrating a method of controlling the electronic device 100 according to an embodiment of the present invention. FIGS. 3 to 7 are views illustrating a method of controlling the electronic device 100 according to an embodiment of the present invention.

Referring to FIG. 2, the controller 180 displays a virtual bookshelf for arranging items on the touch screen 151 (S101). Although it is described that the items are e-books, the present invention is not limited thereto. For examples, the items may include photo albums.

Figure 3:
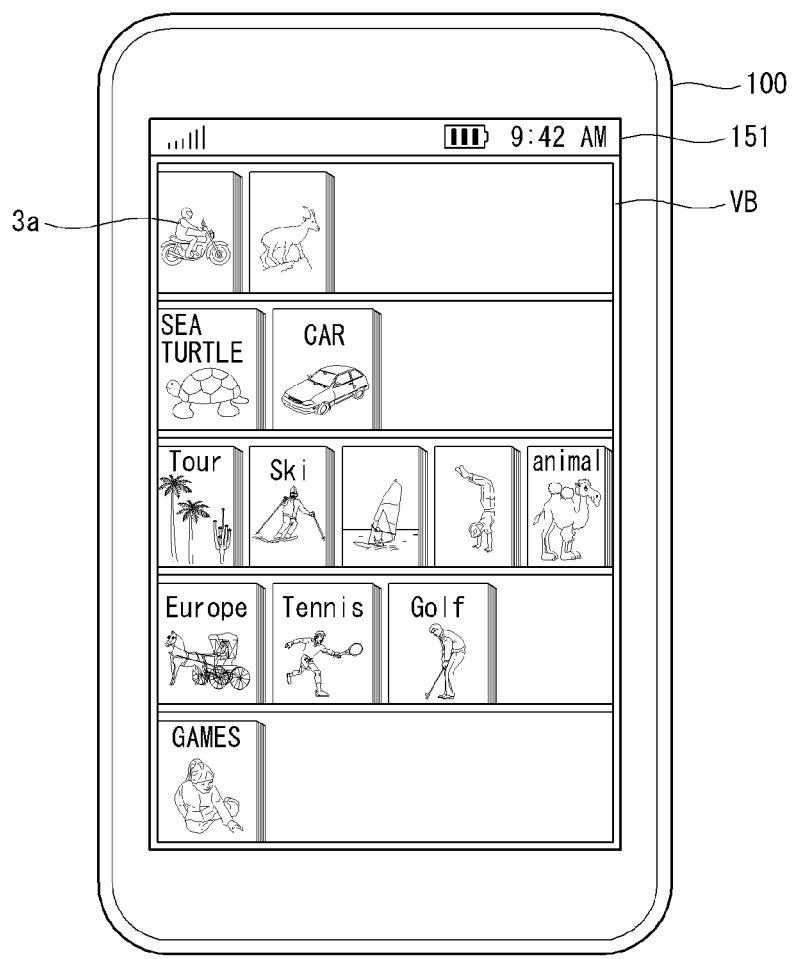
FIGS. 3 to 5 are view illustrating examples of displaying a virtual bookshelf in an electronic device according to an embodiment of the present invention.
Figure 4:
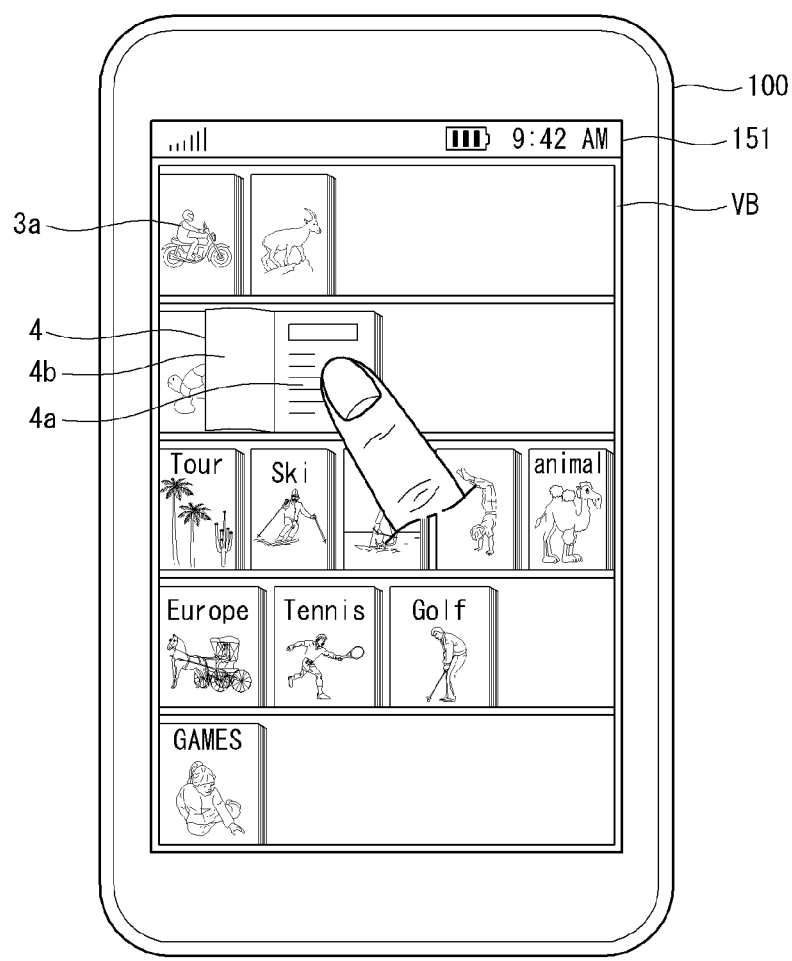
Figure 5:
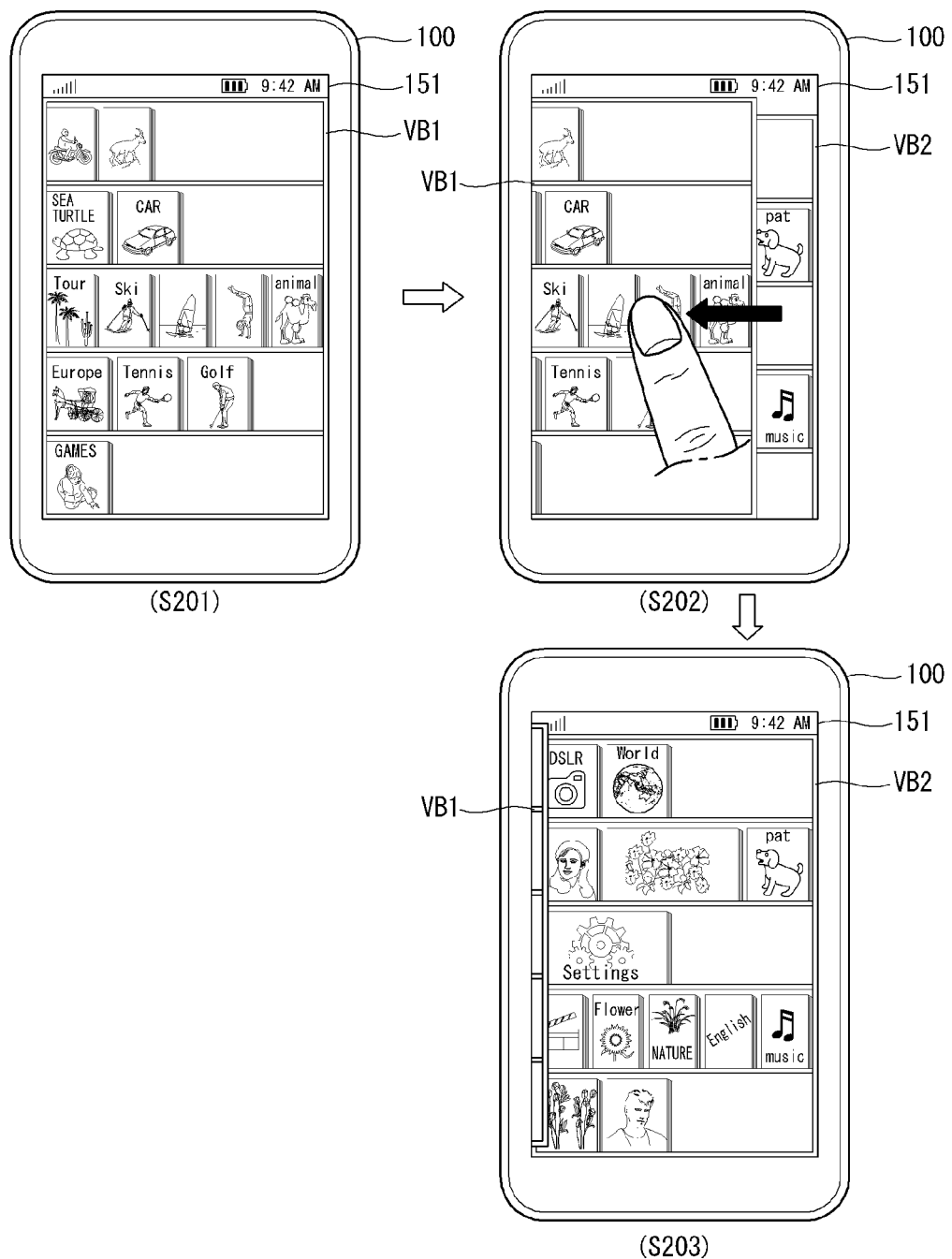

FIGS. 3 to 5 illustrate examples of displaying the virtual bookshelf.

Referring to FIG. 3, the controller 180 displays the virtual bookshelf VB having a plurality of partitions P1 to P4 on the touch screen 151. A plurality of e-books 3a are arranged in the virtual bookshelf VB. Each of the e-books may be displayed as a display image corresponding thereto. The e-books may be displayed in an overlapping manner according to their arrangement space in the virtual bookshelf VB or may be displayed using images of their sides. The location of each of the items arranged in the virtual bookshelf VB may be selected by a user. A user may arrange the items in the virtual bookshelf VB based on at least one criterion.

Referring to FIG. 4, when any one 4 of the items arranged in the virtual bookshelf VB is tapped, the controller 180 may display preview information 4a on the tapped item 4. If the items in the virtual bookshelf VB are e-books, the preview information may include whether a user read the e-book 4 and the author of the e-book 4. The controller 180 may control the display unit 151 so that when the e-book 4 with a book cover 4b is tapped, the book cover 4b is opened to show a page 4a including the preview information.

According to an embodiment, a plurality of virtual bookshelves VB may be provided. If a plurality of virtual bookshelves VB are provided, the controller 180 may change the virtual bookshelves displayed on the screen in response to a drag input. Referring to FIG. 5, the controller 180 displays a first virtual bookshelf VB1 having a plurality of e-books on the touch screen 151 (S201). Thereafter, as the first virtual bookshelf VB1 is dragged, the controller 180 moves the first virtual bookshelf VB1 in the drag direction. As the first virtual bookshelf VB1 is moved, the controller 180 displays part of the second virtual bookshelf VB2 on the touch screen 151 (S202). And, when the first virtual bookshelf VB1 is dragged to be out of the display area, the controller 180 displays the entirety of the second virtual bookshelf VB2 on the screen (S203). For example, as the first virtual bookshelf VB1 is dragged, the controller 180 controls the display unit 151 so that the first virtual bookshelf VB1 is gradually scrolled in the drag direction and the second virtual bookshelf VB2 positioned behind the first virtual bookshelf VB1 is gradually appeared.

The controller 180 may changes the virtual bookshelves displayed on the screen by flicking. For example, when the touch screen 151 displaying the first virtual bookshelf VB1 is flicked, the controller 180 may gradually scroll the first virtual bookshelf VB1 to an outside of the display and the second virtual bookshelf VB2 is appeared on the space emptied as the first virtual bookshelf VB1 is scrolled. Accordingly, the first virtual bookshelf VB1 may be gradually disappeared from the screen and the second virtual bookshelf VB2 may be gradually appeared on the screen.

The items may be selectively arranged in the virtual bookshelves based on at least one criterion. For example, if an item is an e-book, the controller 180 may determine to arrange the e-book in which virtual bookshelf based on the publication date, area, and author of the e-book, or based on whether a user read the e-book. In the latter case, the controller 180 may determine whether the user read the e-book based on whether the e-book has been displayed by the user before. The controller 180 may determine whether the e-book has been read before based on a user's setup.

Turning back to FIG. 2, as the arrangement space in the virtual bookshelf VB displayed on the touch screen 151 is multi-touched and dragged (S102), the controller 180 places a plurality of items arranged in the arrangement space between the firstly multi-touched points in an item group (S103). The controller 180 adds a partition in a virtual bookshelf to distinguish the item group from other items (S104).

Figure 6:
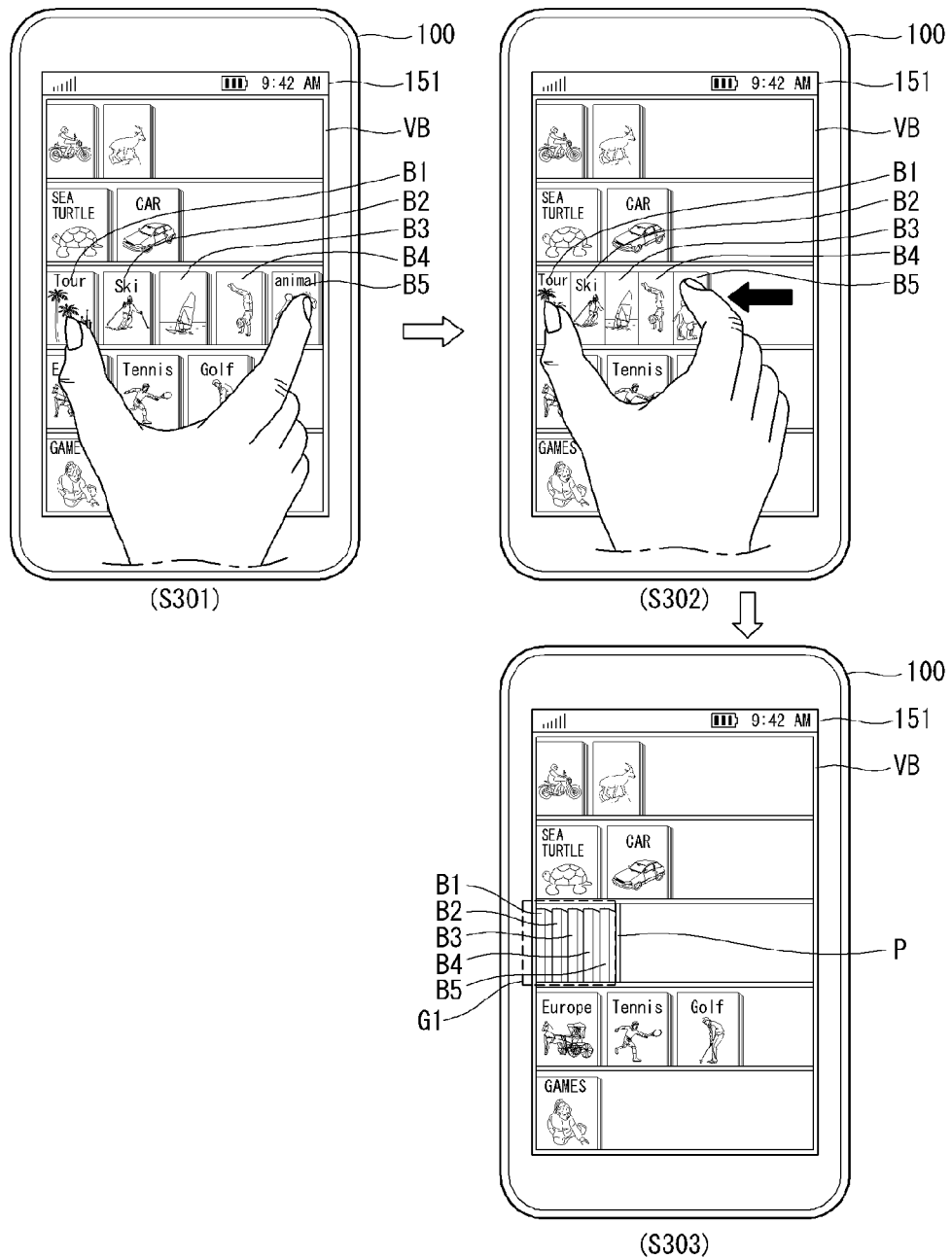
FIG. 6 is a view illustrating an example of grouping items arranged in a virtual bookshelf in an electronic device according to an embodiment of the present invention.
Figure 7:
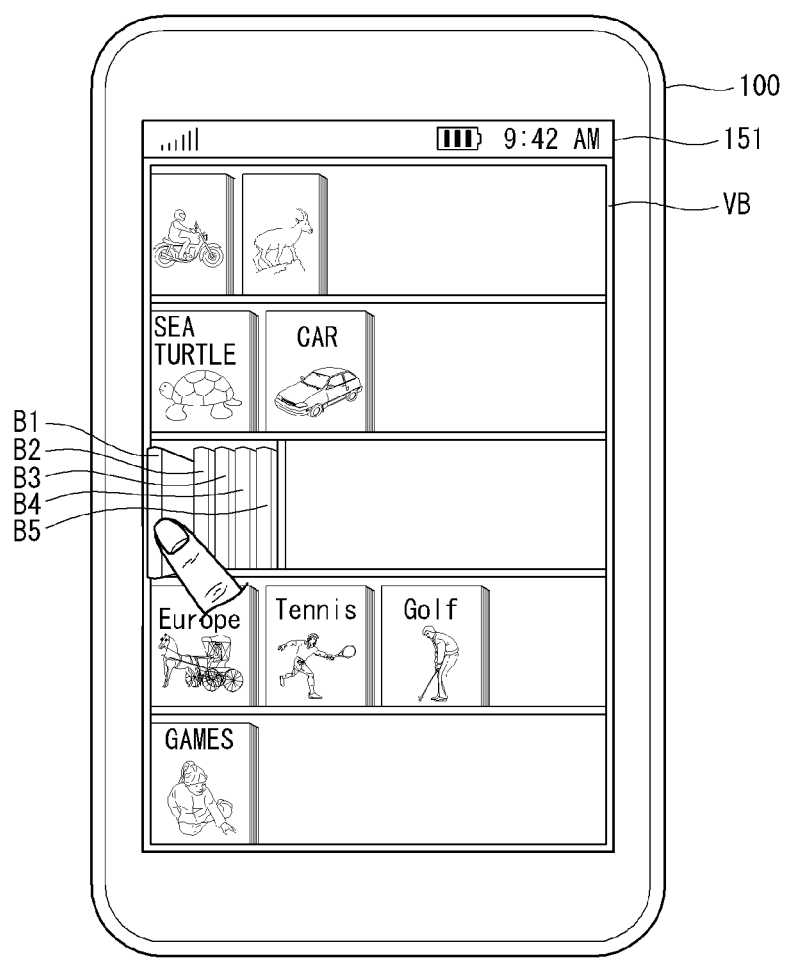
FIG. 7 is a view illustrating an example of selecting an item in an electronic device according to an embodiment of the present invention.

FIGS. 6 and 7 illustrate examples of grouping the items arranged in each virtual bookshelf and selecting the grouped items.

Referring to FIG. 6, the controller 180 receives a multi-touch input on the arrangement space of the virtual bookshelf VB in the touch screen 151 (S301). Thereafter, the controller 180 receives a drag input performed while being multi-touched. For example, the controller 180 receives a drag input starting from at least one point of the multi-touched points. Accordingly, the controller 180 moves a plurality of items B1 to B5 arranged in the arrangement space between the multi-touched points based on the drag path (S302). For example, when the multi-touched points are dragged in the direction of closing the fingers performing the multi-touch, the controller 180 may display the items B1 to B5 so that the items B1 to B5 are gradually gathered. For example, as the items B1 to B5 are gathered, the items B1 to B5 may overlap one another or side images of the e-books may be displayed toward the front. When the multi-touch and drag inputs are received so that the items B1 to B5 are gathered, the controller 180 may place the gathered items B1 to B5 in one item group G1 and may add a partition P in the virtual bookshelf VB to distinguish the item group G1 from the other items (S303). The controller 180 may display side images of the items B1 to B5 included in the item group G1 irrespective of the arrangement space. The e-books may be displayed so that their sides were oriented toward the front.

In a case where the side images of the e-books are displayed as shown in FIG. 6, the controller 180 may control the display unit 151 so that when an item is touched, the touched item is projected compared to the neighboring items.

FIG. 7 illustrates that among the e-books B1 to B5 whose side images are displayed, an e-book B1 is touched to be projected frontward from the other e-books B2 to B5.

According to the embodiment described with reference to FIGS. 2 to 7, a user may arrange or group the items in the virtual bookshelf as he desires by a simple touch gesture. Also, the virtual bookshelves may be layered and moved in response to a user's drag input. Accordingly, a user may feel like he actually selects a book while moving the virtual bookshelves.

A method of controlling the electronic device 100 and an operation of the electronic device 100 according to an embodiment of the present invention will be described with reference to the accompanying drawings.

Figure 8:
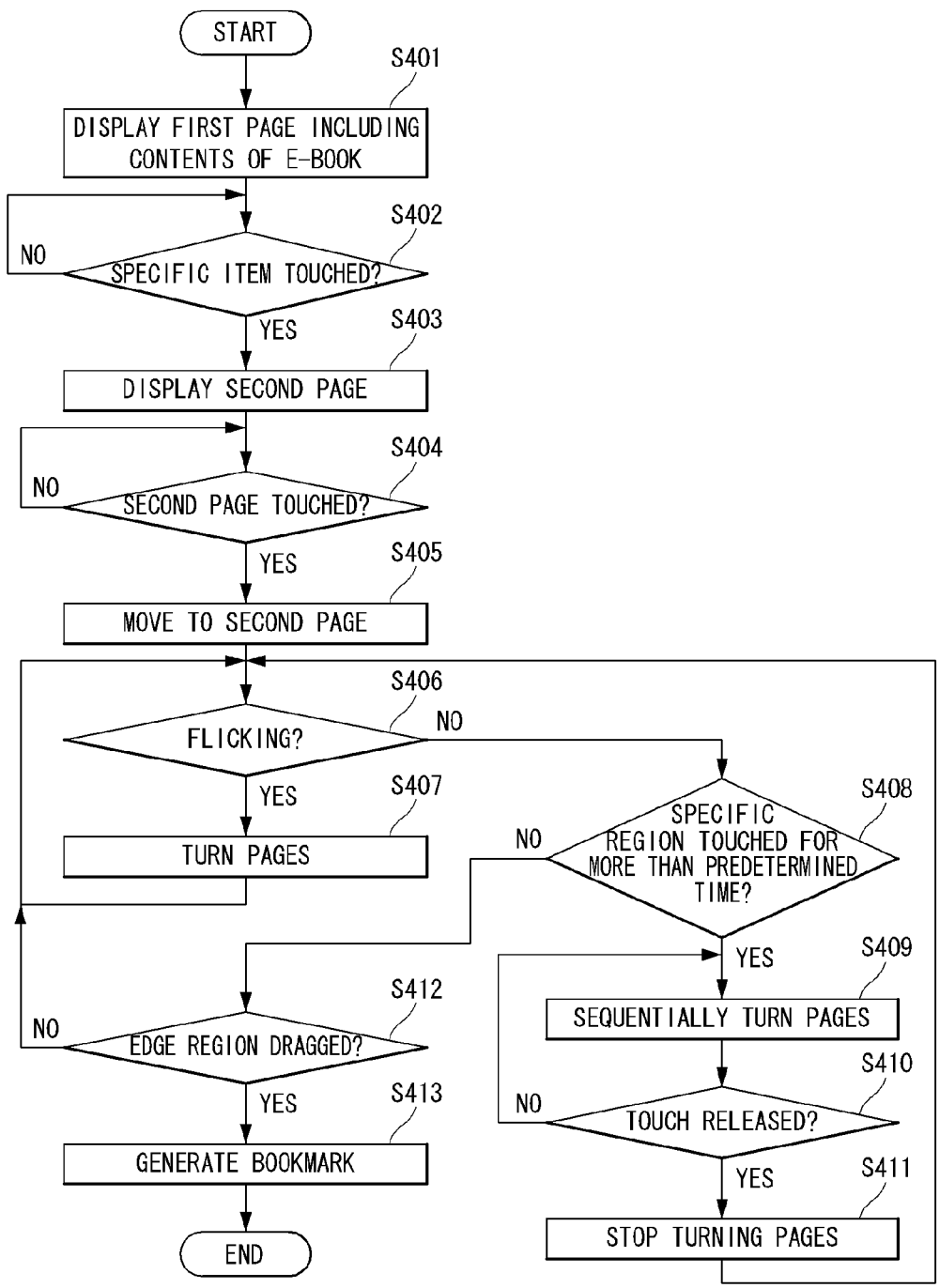
FIG. 8 is a flowchart illustrating a method of controlling an electronic device according to an embodiment of the present invention.

FIG. 8 is a flowchart illustrating a method of controlling the electronic device 100 according to an embodiment of the present invention. FIGS. 9 to 12 are views illustrating a method of controlling the electronic device 100 according to an embodiment of the present invention.

Referring to FIG. 8, the controller 180 displays a first page including contents of an e-book on the touch screen 151 (S401).

When a specific item in the contents is touched (S402), the controller 180 display part of a second page corresponding to the touched item on the touch screen 151 (S403). When an area of the touch screen 151 on which part of the second page is displayed is touched (S404), the controller 180 moves to the second page and for example may display the second page on the entire screen (S405).

Figure 9:
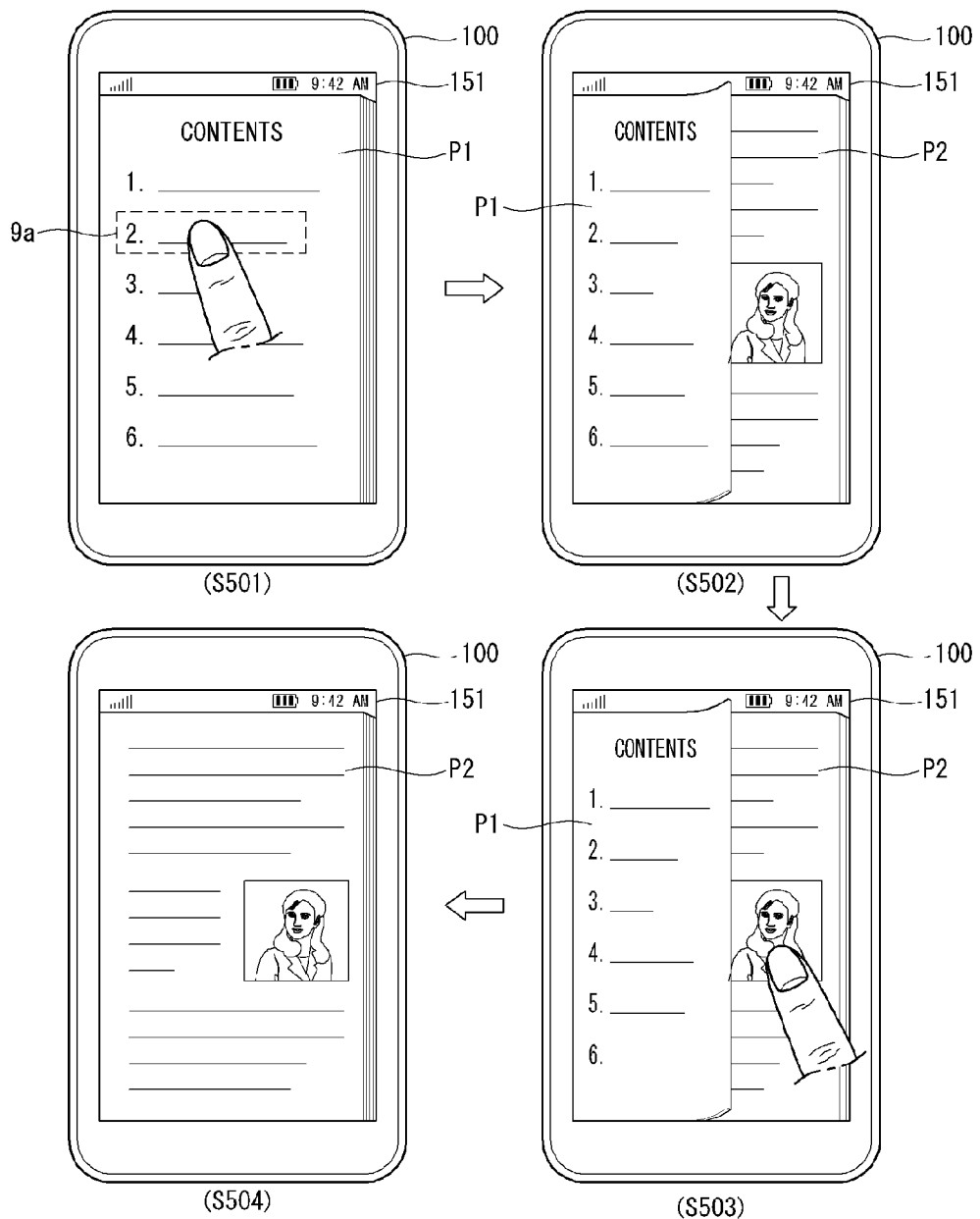
FIG. 9 is a view illustrating an example of selecting a page in contents and moving to the selected page in an electronic device according to an embodiment of the present invention.

FIG. 9 illustrates an example of moving to the second page.

Referring to FIG. 9, the controller 180 displays a first page P1 including contents of an e-book on the touch screen 151. When an item 9a of items included in the contents is touched (S501), the controller 180 partially displays a second page P2 corresponding to the touched item 9a on the touch screen 151 (S502). For example, the controller 180 displays part of the first page P1 including the contents on an area of the touch screen 151 and displays part of the second page P2 on an area of the touch screen 151. For example, the controller 180 may provide an effect like a user actually identifies part of the second page P2 by flipping the first page P1. Thereafter, when the second page P2 partially displayed on the screen is touched (S503), the controller 180 moves to the second page and displays the second page P2 on the entire screen (S504).

Returning to FIG. 8, when the second page is flicked while displayed on the entire screen (S406), the controller 180 moves to the previous or next page and displays the corresponding page (S407). The controller 180 may select a page to be displayed based on the flicking direction.

Figure 10:
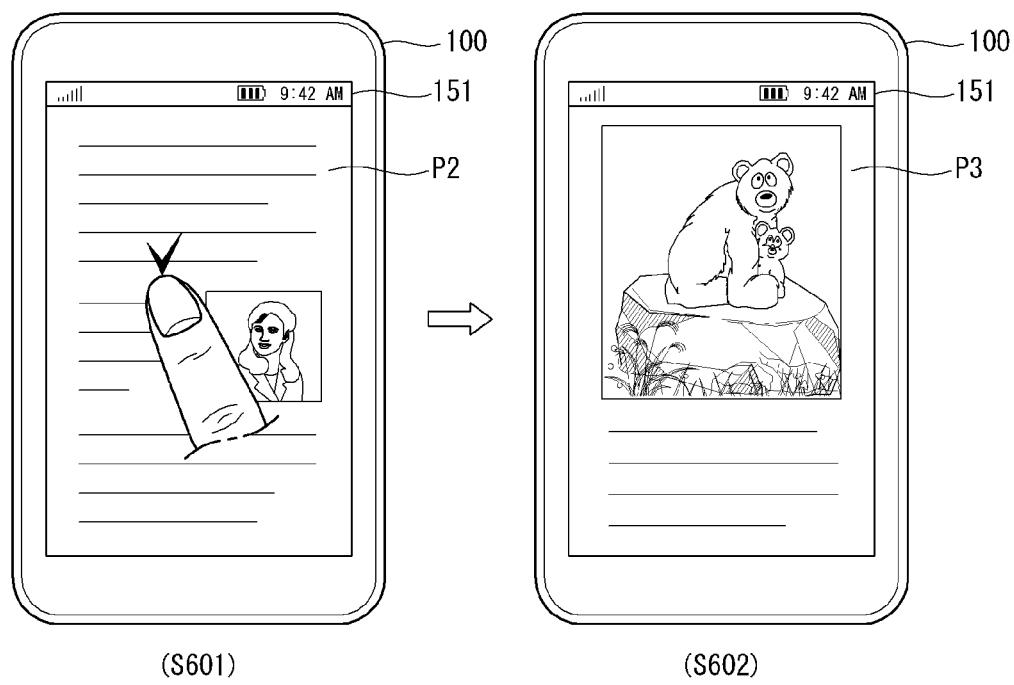
FIG. 10 is a view illustrating an example of flipping pages by flicking in an electronic device according to an embodiment of the present invention.

FIG. 10 illustrates an example of turning over pages by flicking.

Referring to FIG. 10, when the page P2 currently displayed on the touch screen 151 is flicked (S601), the controller 180 moves a previous or next page P3 to the page P2 currently displayed. And, the controller 180 displays the moved page (S602).

Referring back to FIG. 8, when a specific region of the page currently displayed, such as a right side or a left side of the page, is kept touched for more than a predetermined time (S408), the controller 180 sequentially turns over pages while displaying the pages (S409 and S410). When the touch is released, the controller 180 stops turning over the pages (S411).

Figure 11:
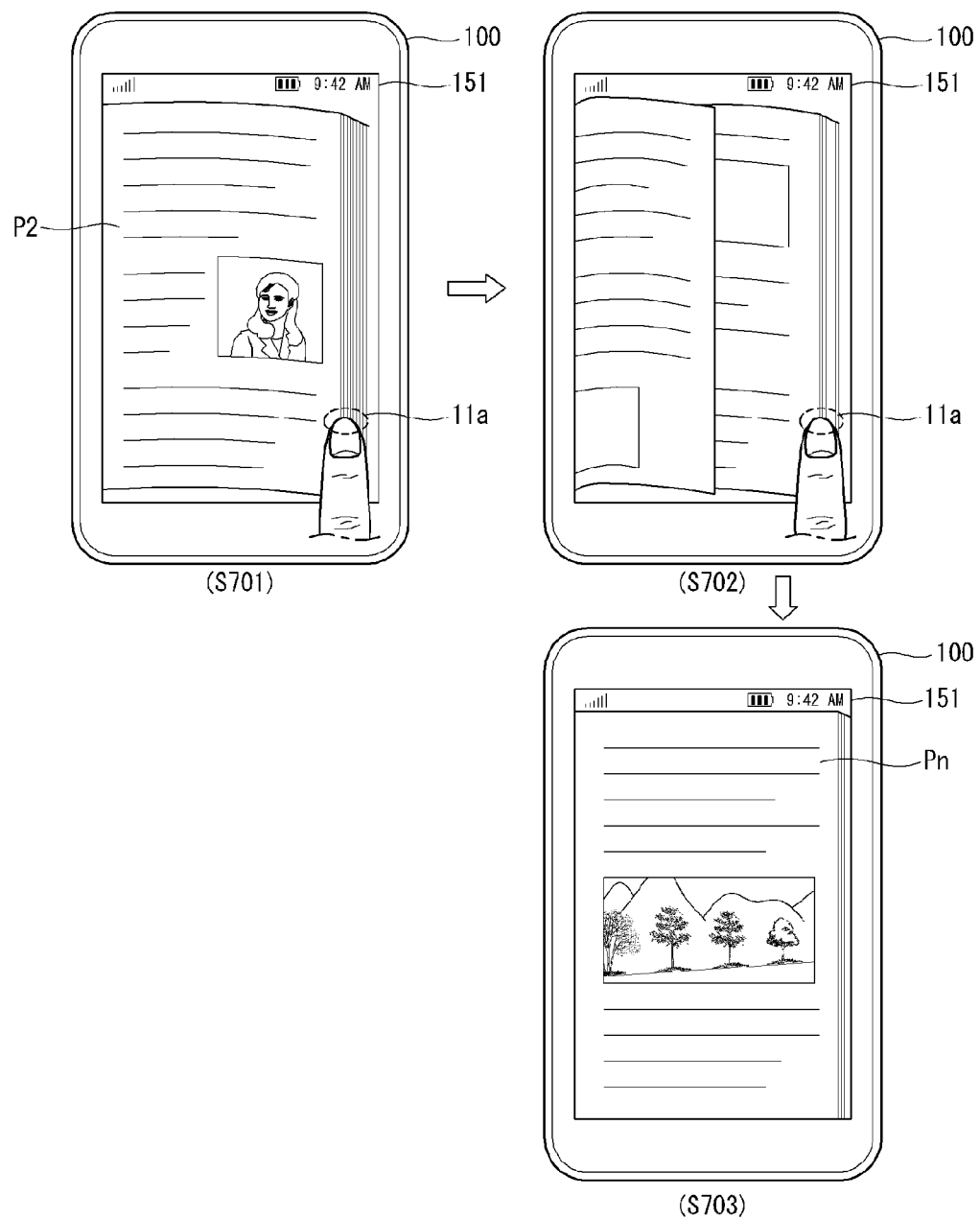
FIG. 11 is a view illustrating an example of sequentially turning pages in an electronic device according to an embodiment of the present invention.

FIG. 11 illustrates an example of sequentially turning over pages while a side of an e-book is kept touched.

Referring to FIG. 11, when a first region 11a of the touch screen 151 is kept touched for more than a predetermined time, the controller 180 sequentially moves to the pages subsequent to the second page P2 (S701 and S702). In step S702, the controller 180 displays the pages so that the pages are sequentially turned over. For example, the controller 180 may display the pages so that while a page is flipped, its next page is gradually appeared. Accordingly, a user may feel like he actually flips pages in a book. When the touch on the first region 11a is released, the controller 180 stops the flip of the pages and displays the page Pn appeared on the screen when the flip is stopped (S703).

Turning back to FIG. 8, upon receiving a drag input of a gesture folding an edge of the page currently displayed on the screen, for example, upon a drag starting at the edge and ending at an inner area (S412), the controller 180 folds the edge of the currently displayed page, generates bookmark information on the current page, and stores the bookmark information in the memory 160 (S413). For example, the controller 180 may generate bookmark information indicating that a user read the e-book up to the current page and may store the bookmark information in the memory 160.

Figure 12:
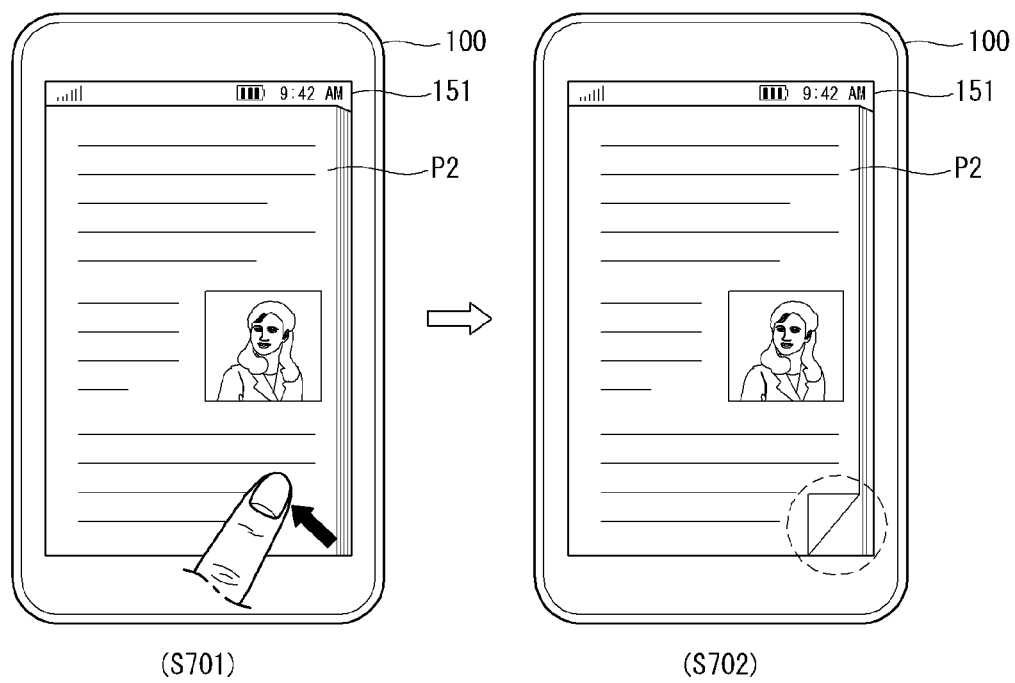
FIG. 12 is a view illustrating bookmark information in an electronic device according to an embodiment of the present invention.

FIG. 12 illustrates an example of generating bookmark information.

Referring to FIG. 12, upon receiving a drag input starting at an edge region of the page currently displayed (S801), the controller 180 may display the page so that the edge region is folded (S802). The edge region may be folded in the drag direction. The controller 180 may generate bookmark information and store the bookmark information in the memory 160.

According to the embodiment described with reference to FIGS. 8 to 12, the controller 180 may easily move to a page corresponding to an item included in contents of an e-book by simply touching the item. A user may see pages sequentially flipped over by keeping touching an edge region of a page. The embodiments of the present invention allow a user to feel like actually reading a book by providing a graphic effect that pages are turned over and an edge of a page is folded.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

FIG. 2
START
S101: DISPLAY VIRTUAL BOOKSHELF
S102: MULTI-TOUCH AND DRAG INPUT RECEIVED?
S103: ITEM GROUPING
S104: DISPLAY PARTITION
END
FIG. 3
SEA TURTLE
GAMES
FIG. 4.
GAMES
FIG. 5
SEA TURTLE
GAMES
NATURE OBSERVATION
FIG. 6
SEA TURTLE
GAMES
FIG. 7
SEA TURTLE
GAMES
FIG. 8
START
S401: DISPLAY FIRST PAGE INCLUDING CONTENTS OF E-BOOK
S402: SPECIFIC ITEM TOUCHED?
S403: DISPLAY SECOND PAGE
S404: SECOND PAGE TOUCHED?
S405: MOVE TO SECOND PAGE
S406: FLICKING?
S407: TURN PAGES
S408: SPECIFIC REGION TOUCHED FOR MORE THAN PREDETERMINED TIME?
S409: SEQUENTIALLY TURN PAGES
S410: TOUCH RELEASED?
S411: STOP TURNING PAGES
S412: EDGE REGION DRAGGED?
S413: GENERATE BOOKMARK
END

What is claimed is:

1. A mobile terminal, comprising:
a wireless communication unit configured to wirelessly communicate with at least one other terminal;
a touch screen; and
a controller configured to:
display a plurality of photo albums on the touch screen with a front surface of the photo albums facing forward and a space existing between each photo album,
receive a pinch-in multi-touch input on the touch screen, rearrange and display the plurality of photo albums as moving closer together until touching and then partially overlapping into a row of albums and to increase an empty display space of the touch screen, and
display a partition for distinguishing the rearranged photo albums,
wherein a first photo album at an outermost portion of the row remains stationary as the other photo albums move closer to the first photo album.

2. The mobile terminal of claim 1, wherein when the plurality of photo albums is flicked or dragged, the controller is further configured to move the plurality of photo albums in a specific direction.

3. The mobile terminal of claim 1, wherein the controller is further configured to display the plurality of photo albums using cover images corresponding photo albums.

4. The mobile terminal of claim 1, wherein when any one of the photo albums is touched, the controller is further configured to display the touched photo album to be projected compared to the other photo albums.

5. The mobile terminal of claim 1, wherein the partition is displayed along at least a portion of a side edge of an end photo album included in the row.

6. The mobile terminal of claim 1, wherein the photo albums included in the row of albums have exposed end surfaces to appear as three-dimensional photo albums.

7. The mobile terminal of claim 1, wherein the controller is further configured to display a first row of photo albums above or below a second row of photo albums.

8. The mobile terminal of claim 1, wherein the controller is further configured to rearrange an order of the photo albums based on the multi-touch input.

9. The mobile terminal of claim 8, wherein the controller is further configured to rearrange the order of the photo albums according to a date of a corresponding photo album.

10. The mobile terminal of claim 1, wherein the controller is further configured to page through respective photos included in a corresponding photo album as pages in a book based on a touch and drag of the respective photos.

11. A method of controlling a mobile terminal, the method comprising:
displaying a plurality of photo albums on a touch screen with a front surface of the photo albums facing forward and a space existing between each photo album;
receiving, via a controller, a pinch-in multi-touch input on the touch screen;
rearranging and displaying the plurality of photo albums as moving closer together until touching and then partially overlapping and to increase an empty display space of the touch screen; and
displaying a partition for distinguishing the rearranged photo albums,
wherein a first photo album at an outermost portion of the row remains stationary as the other photo albums move closer to the first photo album.

12. The method of claim 11, wherein when the plurality of photo albums is flicked or dragged, the method further comprises moving the plurality of photo albums in a specific direction.

13. The method of claim 11, further comprising:
    displaying the plurality of photo albums using cover images of corresponding photo albums.

14. The method of claim 11, wherein when any one of the photo albums is touched, the method further comprises displaying the touched photo album to be projected compared to the other photo albums.

15. The method of claim 11, wherein the partition is displayed along at least a portion of a side edge of an end photo album included in the row.

16. The method of claim 11, wherein the photo albums in the row of albums have exposed end surfaces displayed to appear as three-dimensional photo albums.

17. The method of claim 11, further comprising:
    displaying a first row of photo albums above or below a second row of photo albums.

18. The method of claim 11, further comprising:
    rearranging an order of the photo albums based on the multi-touch input.

19. The method of claim 18, further comprising:
    rearranging the order of the photo albums according to a date of a corresponding photo album.

20. The method of claim 11, further comprising:
    paging through respective photos included in a corresponding photo album as pages in a book based on a touch and drag of the respective photos.

* * * * *